(12) United States Patent
Ostafin et al.

(10) Patent No.: US 6,913,825 B2
(45) Date of Patent: Jul. 5, 2005

(54) PROCESS FOR MAKING MESOPOROUS SILICATE NANOPARTICLE COATINGS AND HOLLOW MESOPOROUS SILICA NANO-SHELLS

(75) Inventors: Agnes E. Ostafin, Granger, IN (US); Robert Nooney, Norwich (GB); Edward Maginn, South Bend, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 116 days.

(21) Appl. No.: 10/251,934

(22) Filed: Sep. 20, 2002

(65) Prior Publication Data

US 2003/0157330 A1 Aug. 21, 2003

Related U.S. Application Data

(60) Provisional application No. 60/323,746, filed on Sep. 20, 2001.

(51) Int. Cl.[7] .................................................. B32B 5/16
(52) U.S. Cl. ....................... 428/402; 428/403; 428/404; 427/212; 427/213.3; 427/213.31; 427/213.34; 427/215; 427/216
(58) Field of Search ............................. 427/212, 213.3, 427/213.31, 213.34, 215, 216; 428/402, 403, 404

(56) References Cited

U.S. PATENT DOCUMENTS

| | | | |
|---|---|---|---|
| 6,096,469 A | 8/2000 | Anderson et al. | |
| 6,174,512 B1 | 1/2001 | Kosuge et al. | |
| 6,264,741 B1 | 7/2001 | Brinker et al. | |
| 6,548,440 B1 * | 4/2003 | Pham et al. | 502/71 |

OTHER PUBLICATIONS

Anderson, M. T. et al., "Surfactant–Templated Silica Mesophases Formed in Water: Cosolvent Mixtures". *Chem. Mater.* 1998, 10, 311–321.
Aronson, B.J. et al., "Solution–Phase Grafting of Titanium Dioxide onto the Pore Surface of Mesoporous Silicates: Synthesis and Structural Characterization", *Chem. Mater.*, 1997, 9, 2842–2851.
Beck, J. S. et al., "A New Family of Mesoporous Molecular Sieves Prepared with Liquid Crystal Templates", *J. Am. Chem. Soc.* 1992, 114, 10834–10843.
Branton, P.J. et al., "Physisorption of Nitrogen and Oxygen by MCM–41, a Model Mesoporous Adsorbent", *J. Chem. Soc., Chem. Commun.*, 1993, 1257–1258.
Brown, K.R. et al., "Seeding of Colloidal Au Nanoparticle Solutions. 2. Improved Control of Particle Size and Shape". *Chem. Mater.*, 2000, 12: 306–313.
Büchel, G. et al., "Tailored syntheses of nanostructured silicas: Control of particle morphology, particle size and pore size", *Supramolecular Sci.*, 1998, 5, 253–259.
Buining, P. et al., "Preparation of Functional Silane–Stabilized Gold Collodis in the (Sub)nanometer Size Range", *Langmuir*, 1997, 13, 3921–3926.
Cai, Q. et al., Dilute Solution Routes to Various Controllable Morphologies of MCM–41 Silica with a Basic Medium, *Chem. Mater.*, 2001, 13, 258–263.
Cai, W. et al., "Optical measurements of oxidation behavior of silver nanometer particle within pores of silica host", *J. Appl. Phys.* 1998, 83(3), 1705–1710.
Firouzi, A. et al., "Cooperative Organization of Inorganic–Surfactant and Biomimetic Assemblies", *Science* 1995, 267, 1138–1143.
Fontell, K. et al., "Phase equilibria and structures in ternary systems of a cationic surfactant ($C_{16}$TABr or ($C_{16}$TA)$_2$SO$_4$), alcohol, and water". *Colloid Polym. Sci.*, 1991, 269, 727–742.
Fowler, C. E. et al., "Nanoscale Materials with Mesostructured Interiors", *Adv. Mater.*, 2001, 13, 649–652.
Grün, M. et al., "Novel pathways for the preparation of mesoporous MCM–41 materials: control of porosity and morphology", *Microporous Mesoporous Mater.*, 1999, 27, 207–216.
Hirai, T. et al., "Size–Selective Incorporation of CdS Nanoparticles into Mesoporous Silica", *J. Phys. Chem.*, 1999, 103, 4228–4230.
Huo, Q. et al., "Preparation of Hard Mesoporous Silica Spheres", *Chem. Mater.* 1997, 9, 14–17.
Huo, Q. et al., "Organization of Organic Molecules with Inorganic Molecular Species into Nanocomposite Biphase Arrays", *Chem. Mater.* 1994, 6, 1176–1191.
Kresge, M.E. et al., "Ordered mesoporous molecular sieves synthesized by a liquid–crystal template mechanism", *Nature*, 1992, 359, 710–712.
Liz–Marzan et al., Synthesis of Nanosized Gold–Silica Core–Shell Particles. *Langmuir*, 1996, 12, 4329–4335.
Lu, Y. et al., "Aerosol–assisted self–assembly of mesostructured spherical nanoparticles", *Nature*, 1999, 398, 223–226.
Maddox, M.W. et al., "Molecular Simulation of Fluid Adsorption in Buckytubes and MCM–41[1"] *Int. J. Thermophys.*, 1994, 15, 1115–1122.
Makarova, O.V. et al., "Adsorption and Encapsulation of Fluorescent Probes in Nanoparticles", *J. Phys. Chem.*, 1999, 103, 9080–9084.

(Continued)

Primary Examiner—Monique R. Jackson
(74) Attorney, Agent, or Firm—Barnes & Thornburg LLP

(57) ABSTRACT

Nanoparticles, nanocomposites, and methods for making the nanoparticles and nanocomposites are disclosed. Illustrated methods include preparing a nanocomposite particle by binding a silicate compound to the surface of a core particle in an aqueous suspension, adding a silicate source and an organic surfactant template, and stirring the aqueous suspension to obtain silicate growth. The resultant nanoparticles and nanocomposites have desired mesoporous silicate structure

6 Claims, 12 Drawing Sheets

OTHER PUBLICATIONS

Marinakos, S.M. et al., "Gold Particle as Templates for the Synthesis of Hollow Polymer Capsules. Control of Capsule Dimensions and Guest Encapsulation", *J. Am. Chem. Soc.*, 1999, 121, 8518–8522.

McKelvey, C.A. et al., "Templating Hollow Polymeric Spheres from Catanionic Equilibrium Vesicles: Synthesis and Characterization", *Langmuir*, 2000, 16: 8285–8290.

Monnier, A. et al., "Cooperative Formation of Inorganic–Organic Interfaces in the Synthesis of Silicate Mesostructures", *Science* 1993, 261, 1299–1303.

Mukherjee, P. et al., "Entrapment and catalytic activity of gold nanoparticles in amine–functionalized MCM–41 matrices synthesized by spontaneous reduction of aqueous chloroaurate ions", *PhysChemComm*, 2001, 5, 1–2.

Mulukurtla, R. S. et al., "Synthesis and characterization of rhodium oxide nanoparticles in mesoporous MCM–41", *Phys. Chem. Chem. Phys.*, 1999, 1, 2027–2032.

Ozin, G.,et al., "Nanochemistry: Synthesis in Diminishing Dimensions", *Adv. Mater.* 1992, 4, 612–649.

Parala, H. et al., "Confinement of CdSe Nanoparticles Inside MCM–41", *Adv. Mater.*, 2000, 12, 1050–1055.

Sandroff, C. J. et al., "Kinetics of Displacement and Charge–Transfer Reactions Probed by SERS: Evidence for Distinct Donor and Acceptor Sites on Colloidal Gold Surfaces", *Langmuir*, 1985, 1, 131–135.

Schissler, J. et al., "Behaviour of Paraffin Hydrocarbons on Electron Impact", *Mass Spectra.*, 1951, 46–53.

Schmidt, R. et al., "Pore Size Determination of MCM–41 Mesoporous Materials by means of $^1H$ NMR Spectroscopy, $N_2$ adsorption, and HREM. A Preliminary Study", *J. Am. Chem. Soc.* 1995, 117, 4049–4056.

Shi, H. et al., "Preparation and optical absorption of gold nanoparticles within pores of mesoporous silica", *Mat. Res. Bulletin.*, 2000, 35, 1689–1695.

Sing, K.S.W. et al., "Reporting Physisorption Data For Gas/Solid Systems with Special Reference to the Determination of Surface Area and Porosity", *Pure Appl. Chem.*, 1985, 57, 603–619.

Stöber, W. et al., "Controlled Growth of Manodisperse Silica Spheres in the Micron Size Range", *Colloid Interface Sci.*, 1968, 26, 62–69.

Xu, Y. et al., "Photoactivity of Titanium Dioxide Supported on MCM41, Zeolite X, and Zeolite Y", *J. Phys. Chem.*, 1997, 101, 3115–3121.

\* cited by examiner

Fig. 11
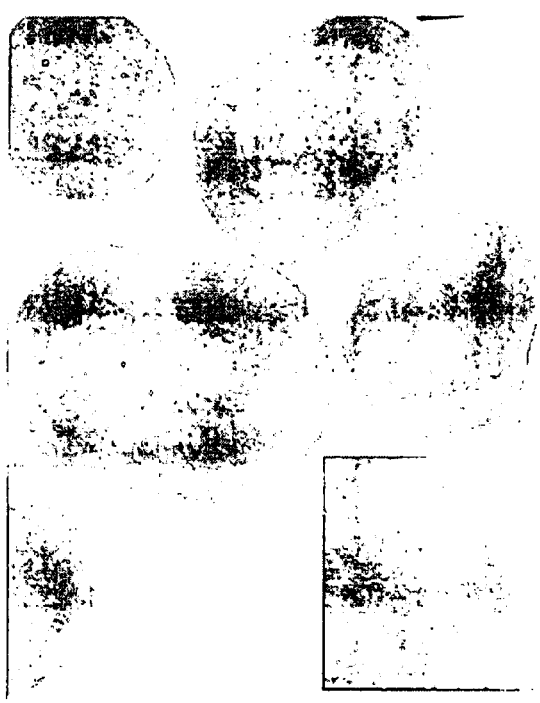
Fig. 12a
Fig. 12b

PROCESS FOR MAKING MESOPOROUS SILICATE NANOPARTICLE COATINGS AND HOLLOW MESOPOROUS SILICA NANO-SHELLS

This application claims priority under 35 U.S.C. § 119(e) to U.S. Provisional Application No. 60/323,746, filed Sep. 20, 2001, which is expressly incorporated by reference herein.

US GOVERNMENT RIGHTS

This invention was made with United States Government support under Contract No. CTS-0074932, awarded by the National Science Foundation. The United States Government has certain rights in the invention.

FIELD OF THE INVENTION

The present invention relates to methods for producing mesoporous silicate nanocomposite particles. This invention also relates to the particles produced by these methods.

BACKGROUND AND SUMMARY OF THE INVENTION

The present invention relates to mesoporous silicate-coated nanoparticles, hollow mesoporous silicate nano-shells, and colloidal synthesis methods for producing the nanoparticles and nano-shells. More particularly, this method allows for depositing a controlled-porosity silicate shell around nanoparticles.

Mesoporous materials possess pore structure with diameters in the nanometer range. Chemically passive, electrically insulating, and optically transparent, silica nanocomposites of sub-micron particle size have applications, for example, as low dielectric constant insulators in nano-capacitors and semiconductor devices. Controlled porosity nanocomposites may find applications, for example, in the areas of chromatography, photographic imaging, and pigmentation, as well as in drug delivery. Mesoporous silicate-coated nanoparticles and nano-shells for use in other applications are within the scope of this invention.

The first nanocomposites of sub-micron length scale containing mesoporous silica and gold nanoparticles ranging in size from 1 to 3 nm were prepared using an aerosol-assisted self-assembly method. "Aerosol-assisted self-assembly of mesostructured spherical nanoparticles," Yunfeng Lu, Hongyou Fan, Aaron Stump, Timothy L. Ward, Thomas Rieker and C. Jeffrey Brinker, Nature, 1999, 398, 223–226. Inverse micelles were used to stabilize gold nanoparticles, and to deliver them into the hydrophobic mesopores of the silicate material as it self-assembled, and the resulting nano-meter sized composite contained multiple gold particles.

In another method, microporous (Angstrom-sized pores) silicate nano-shells have been developed as inert protective shells around semiconductor and metal nanoparticles whose optical properties are intimately tied to the particle size and the surface conditions. See, e.g., "Synthesis of Nanosized Gold-Silica Core-Shell Particles," Luis M. Liz-Marzan, Michael Giersig, and Paul Mulvaney, Langmuir, 1996, 12, 4329–4335. By covering metal nanoparticles with a thin layer of transparent silicate, the optical properties of these nanoparticles are preserved. This prior art method involved slow polymerization of sodium silicate or tetramethyl-sodium silicate under basic conditions. Chemical dissolution of the metal nanoparticle core resulted in the formation of hollow silicate shells with central diameters defined by the size of the original nanoparticle.

The present invention is directed to silicate nanoparticles and nano-shells with tailored porosity. The methods of the present invention provide systematic control of the thickness, porosity, and pore structure of a nanometers-thick mesoporous silicate coating. For example, mono-disperse spherical nanocomposites approximately 400±100 nm in diameter of mesoporous silicate and a single gold particle approximately 60 nm in diameter have been prepared using exemplary liquid-phase self-assembly processes of the present invention. In other embodiments, spherical mesoporous nanoparticles from 65 to 740 nm have been achieved. Thickness, porosity, and pore structure may be controlled to produce nanoparticles and nano-shells tailored to a specific application. For example, controlled porosity silicate coatings may be used to protect and control the chemical reactions of active particles encapsulated within. Among other things, controlled porosity nano-shells can be used to create specialized chemical nano-environments for reactive molecules. Some of the species that can be encapsulated in these particles include metal nanoparticles, metal oxide nanoparticles, nanocatalysts, organic dye molecules, flavors and aromas, and biochemicals such as DNA, RNA, proteins, and enzymes. Moreover, controlled porosity allows use in conditions that are chemically harsh, poisoning, or denaturing.

Another aspect of the invention is the controlled delivery of an active species trapped inside a controlled porosity silicate nanoshells, allowing control of macroscale reaction and release/diffusion rates. The porous network can be chemically modified in a post-processing step and can yield particles that are chemically selective, by slowing or enhancing the diffusion of one type of molecule or ion over others. The ability to create chemically tailored and chemically active units with chemistry controlled by the nature of the shell has the potential to revolutionize the field of chemical and biochemical catalysis. For example, mixing and matching of these species allows the design of complex reactor membranes for sequential chemical and biochemical reactions.

The chemically passive, electrically insulating, and optically transparent silica nanocomposites of sub-micron particle size of this invention are useful low dielectric constant insulators in nano-capacitors and semiconductor devices. In addition, the controlled nanometers-thick mesoporous silicate coating of the present invention are useful in the areas of chromatography, photographic imaging, and pigmentation, as well as in drug delivery.

An additional aspect of the present method is the use of nano-shells to control the delivery of the nano-shell contents over a long period of time, for example, to create reliable implantable patches for slow-release of drugs and medicines such as insulin. This is a particularly well-suited application, as silicate is biologically and chemically inert. Therefore, silicate patches with designed delivery characteristics may maintain their programmed release rates over extended periods in contrast to existing technologies, in which bio-degradable polymer coatings change their release patterns as a function of time.

Another aspect of the present method is that controlled porosity silicate nanoshells may be used to create a high-density, high surface capacity powder. The controlled porosity of the silicate nanoshells may be exploited for the storage of volatile gaseous species such as hydrogen, oxygen, or methane. The nanoshells also may be used in the design of novel fuel cells and other energy storage devices that could be used in objects such as automobiles, airplanes, and rockets.

Additional features of the present method will become apparent to those skilled in the art upon consideration of the following detailed description of preferred embodiments exemplifying the best mode of carrying out the method as presently perceived.

BRIEF DESCRIPTION OF THE DRAWINGS

The detailed description particularly refers to the accompanying figures in which:

FIG. 11 is a transmission electron micrograph of microtomed gold/mesoporous silica nanocomposite particles having peanut shaped crystalline morphology.

FIGS. 12a–b are transmission electron micrographs of microtomed mesoporous silica nanocomposite particles having crystalline morphology.

FIGS. 13a–f correspond to experiments 12a–f, respectively.

DETAILED DESCRIPTION OF THE INVENTION

Figure 1:
FIG. 1 is a transmission electron micrograph of a microtomed gold/mesoporous silica nanocomposite particle showing a gold particle surrounded by a mesoporous silica shell approximately 150 nm in thickness.

The methods of the present invention employ a liquid-phase self-assembly process to produce nanoparticles and nano-shells with pre-defined characteristics. The methods employed to make this material involve the addition of the silica source and organic template to an aqueous suspension of gold nanoparticles. The pore size of the resultant nanoparticles can be controlled, with pores ranging from less than 2 Angstroms to 15 nanometers or greater. Pore structure also may be controlled, and nanoparticles having, for example, starburst or crystalline morphologies are within the scope of this invention. The resultant nanoparticles may be symmetrical, with the metallic core or void space located at the center of the particle, or they may be asymmetrical, with the metallic core or void space offset. Shape, pore structure, and symmetry may be controlled by selecting the appropriate silica source and organic template.

In an illustrated example of the liquid-phase self-assembly process, each mesoporous silicate nanoparticle contains only a single gold particle inside. The individual particle size, pore organization, and gold occupancy are each controllable by the stoichiometric mixing of the silicate and organic components. After calcinations, the gold nanoparticle in the center of the mesoporous nanocomposite may be removed chemically using an aqueous solution of sodium cyanide, to yield hollow mesoporous silicate nano-shell of identical dimensions. See O. V. Makarova, A. E. Ostafin, H. Miyoshi, J. R. Norris Jr., *J. Phys. Chem.* B 1999, 103, 9080. In another embodiment, a uniformly separated two-dimensional array of gold particles embedded in a mesoporous silicate base could also be obtained by allowing the monodispersed nanoparticles to aggregate.

In an illustrated embodiment, the gold nanoparticles are formed using a seeded growth method, as described in Example 1 below. A sulfur containing silicate compound, for example, mercaptopropyl-trimethoxysilane (MPTS) is bound to the surface of the gold particles. Other compounds as are known in the art may be used to make the surface vitreophilic. Optionally, the surface may be further protected with a thin layer of microporous silica, for example by using sodium silicate according to the method of Liz-Marzan. L.M Liz-Marzan, M. Giersig, P. Mulvany, *Langmuir*, 1996, 12, 4329. By protecting the surface with microporous sodium silicate, the yield of mesoporous silica/gold particles can be increased up to 100%, with gold present in a highly ordered fashion. Subsequently, a silicate source, for example tetraethylorthosilicate (TEOS), and an organic substrate, for example cetyl-trimethylammonium bromide (CTAB), are added. After growth with rapid stirring, the sample may be filtered to recover the resultant particles. It is understood that other silicate sources may be used, for example tetramethylorthosilicate (TMOS) and tetrapropylorthosilicate (TPOS). Also, it is understood that other organic substrates may be used including cetyl-trimethyl ammonium hydroxide, dodecylamine, dioctyl-dimethyl ammonium bromide, didecyl-dimethyl ammonium bromide, didodecyl-dimethylammonium bromide, dihexadecyl-dimethyl ammonium bromide, and dicetyl-dimethyl ammonium bromide. Other organic silicate sources and organic templates may be used within the scope of this disclosure.

Pore size may be controlled by the choice of organic template. When a charged template such as CTAB is used, pore sizes are approximately 1 nm in diameter, as seen with the nanoparticles formed in Example 2 below. Prior studies have shown that the addition of carbons to the quaternary ammonium surfactant, $C_nH_{2n+1}(N(CH_3)_3)^+$, where 14<n<22, the internal pore diameter increases about 0.1 nm to about 0.12 nm per carbon. See Monier, A "Cooperative formation of inorganic-organic interfaces in the synthesis of silicated mesostructures," Science 261, 1299–1202 (1993). Larger pore diameters may be achieved by using, for example, neutral templates. Such neutral templates, for example n-dodecylamine, produce nanoparticles having pores in the 3 to 5.6 nm range. Still larger pore diameters may be achieved by using amphiphilic compounds such as triblock copolymers of poly alkene oxides. With the addition of a co-solvent, pore sizes in the range of 4.6 to 30 nm are expected.

A co-solvent may be used to affect the symmetry of the developing nanoparticles. For example, when the silicate source is tetramethylorthosilicate (TMOS), nanoparticle growth in the absence of a co-solvent (heterogeneous synthesis) is directional, and the gold particle is located off-center in the resultant nanoparticles. Yet, when methanol is used as a co-solvent (homogeneous synthesis), the gold particles are centrally located. Similar results have been obtained with TEOS and ethanol as the co-solvent. Similarly, a change in solvent or co-solvent can alter the structure from starburst to crystalline, as seen in the examples below.

Once the nanoparticles have been synthesized, the colloidal metal particle may be removed by dissolving, for example with a sodium cyanide solution. Furthermore, depending on intended use, it is possible to functionalize the surfaces of the mesopore channels. One such example is to bind mercaptopropyltrimethoxysilane. The thiol group extends into the pore of the channel and may be used, for example, for selective removal of heavy metals. Another example is to synthesize the nanoparticles using a triblock copolymer-templated solution. It is expected that these nanoparticles would precipitate apatite. Such nanoparticles may have a multitude of uses, for example in orthopaedic applications. In still another example, the nanoparticles of this invention may be formed within the mesopore channels of existing mesoporous silica. It is understood that the mesopore channels may be functionalized in a multitude of ways, depending on use.

While colloidal gold is provided in the illustrated embodiments, it is understood that other materials could be used to form the core. For example, other colloidal metals may be used. Illustratively, if Pd or Rh are used, the nanoparticles would have catalytic reactivity. Additionally, it is known that materials such as polymers and liquids can be encapsulated in amorphous silicate. The methods of the present invention may be used to encapsulate such materials in mesoporous silicate.

EXAMPLE 1

Synthesis of Gold Nanoparticles

Colloid gold particles with a mean particle diameter of 60 nm and 20% size polydispersity were prepared using a seeded-growth method developed by Brown et al. "Entrapment and catalytic activity of gold nanoparticles in amine-functionalized MCM-41 matrices synthesized by spontaneous reduction of aqueous chloroaurate ions," Priyabrata Mukherjee, Chitta Ranjan Patra, Rajiv Kumar, and Murali Sastry, Physical Chemistry Communications, 2001, 5, 1–2. In this method a gold sol containing particles 15 nm in diameter is used as the initiating seed. The particles were prepared following the method by Turkevich and coworkers in which a boiling solution of 1 wt % hydrogentetrachloroauric acid ($HAuCl_4.3H_2O$) (Aldrich) in deionized water is reduced with sodium citrate (Fisher Scientific). "Size-selective incorporation of CDs nanoparticles into mesoporous silica," Takayuki Hirai, Hironori Okubo, and Isao Komasawa, Journal of Physical Chemistry, B., 1999, 103, 4228–4230. The final concentration of gold particles was $2.9 \times 10^{12}$ particles per ml. Ten ml of this seed solution was diluted to 100 ml using deionized water. Colloidal particles 25 nm in diameter were grown by adding 0.83 ml of 0.2 M hydroxylamine-hydrochloride solution ($NH_2OH$—$HCl$) (Fisher Scientific) and 0.95 ml of 1 wt % $HAuCl_4.3H_2O$ solution with vigorous stirring. Twenty-five ml of this solution was diluted to 100 ml using deionized water, and colloidal particles 45 nm in diameter were grown by adding 0.562 ml of 0.2 M $NH_2OH$—$HCl$ solution and then 0.95 ml of 1 wt % $HAuCl_4.3H_2O$ solution with vigorous stirring. Fifty ml of deionized water was added to this and colloidal particles 60 nm in diameter were finally grown by adding 0.375 ml of 0.2M $NH_2OH$—$HCl$ solution and then 0.95 ml 1 wt % $HAuCl_4.3H_2O$ solution with vigorous stirring. The concentration of 60 nm gold particles obtained in this way was $3.62 \times 10^{10}$ particles per ml. The conductivity of the gold sol was reduced from $800 \mu S$ to less than $20 \mu S$ by dialyzing against deionized water using Snakeskin dialysis tubing (10,000 MWCO, Pierce).

EXAMPLE 2

Synthesis of Mesoporous Silicate

In a standard procedure, see "Synthesis of Nanosized Gold-Silica Core-Shell Particles," Luis M. Liz-Marzan, Michael Giersig, and Paul Mulvaney, Langmuir, 1996, 12, 4329–4335, 512 $\mu L$ of 0.0005 M mercaptopropyltrimethoxysilane (MPTS, Aldrich) in ethanol was added to 317 ml of 60 nm diameter colloidal gold solution while rapidly stirring. Assuming all added MPTS were bound to the colloidal gold, this amount of MPTS would cover approximately 70% of each particle's surface area. After stirring for 15 minutes, 317 ml of the MPTS-treated gold colloid was diluted to 421 ml using deionized water (2 $\mu S$), and warmed to 40° C. using a hot plate with rapid stirring. To this solution 43.3 g of $NH_4OH$ (29.7 wt % $NH_3$ in $H_2O$, Fisher Scientific) was added, the temperature raised to 50° C. and 1.12 g of cetyl-trimethylammonium bromide (CTAB, Aldrich) added. After five minutes, 5.21 g of tetraethylorthosilicate (TEOS, Aldrich) was added slowly with rapid stirring. See "Controlled growth of monodisperse silica spheres in the micron size range," Werner Stober Arthur Fink and Ernst Bohn, Journal of Colloid and Interface Science, 1968, 26, 6269. The final molar ratio of the sol was $1005H_2O$: 30.2 $NH_3$: 1 $SiO_2$: 0.123 CTAB. The sol was aged for two hours with stirring at room temperature. The solution pH during this period increased from 10.1 to a final value of 10.7. Nanoparticles were recovered by filtration over a sintered glass frit (pore size 0.2 microns). To remove the CTAB template, the material was calcined at 540° C. for eight hours in an air atmosphere.

EXAMPLE 3

Transmission Electron Microscopy

Electron microscopy of the nanoparticles produced in Example 2 was carried out using a Philips CM120 electron microscope operating at 125 KV with a 35 micron objective aperture. Micrographs were recorded at an electron optical magnification of 125,000 using Kodak SO163 film developed in D19 for 5 minutes. Specimens were embedded in LR White resin and cured prior to sectioning 70 nm thick samples. Samples were picked up on a carbon coated copper grid. FIG. 1 is a transmission electron micrograph of a microtomed section of an as-synthesized (non-calcined) mesoporous silicate/gold nanocomposite particle. The material contains randomly packed sections of ordered cylindrical mesopores. The pore center-to-pore center distance is about 3.8 nm and the pore wall thickness is approximately 1 nm. The gold colloid shown in FIG. 1 is 66 nm in diameter.

EXAMPLE 4

X-Ray Diffraction Studies

Powder X-ray diffraction patterns for the nanoparticles produced in Example 2 were collected using a Scintag XDS 2000 diffractometer with CuKα radiation source and equipped with a diffractometer beam monochromator. Scattering patterns were collected from 1.5 to 10° with a scan time of 5.0 seconds per 0.01° step.

Figure 2:
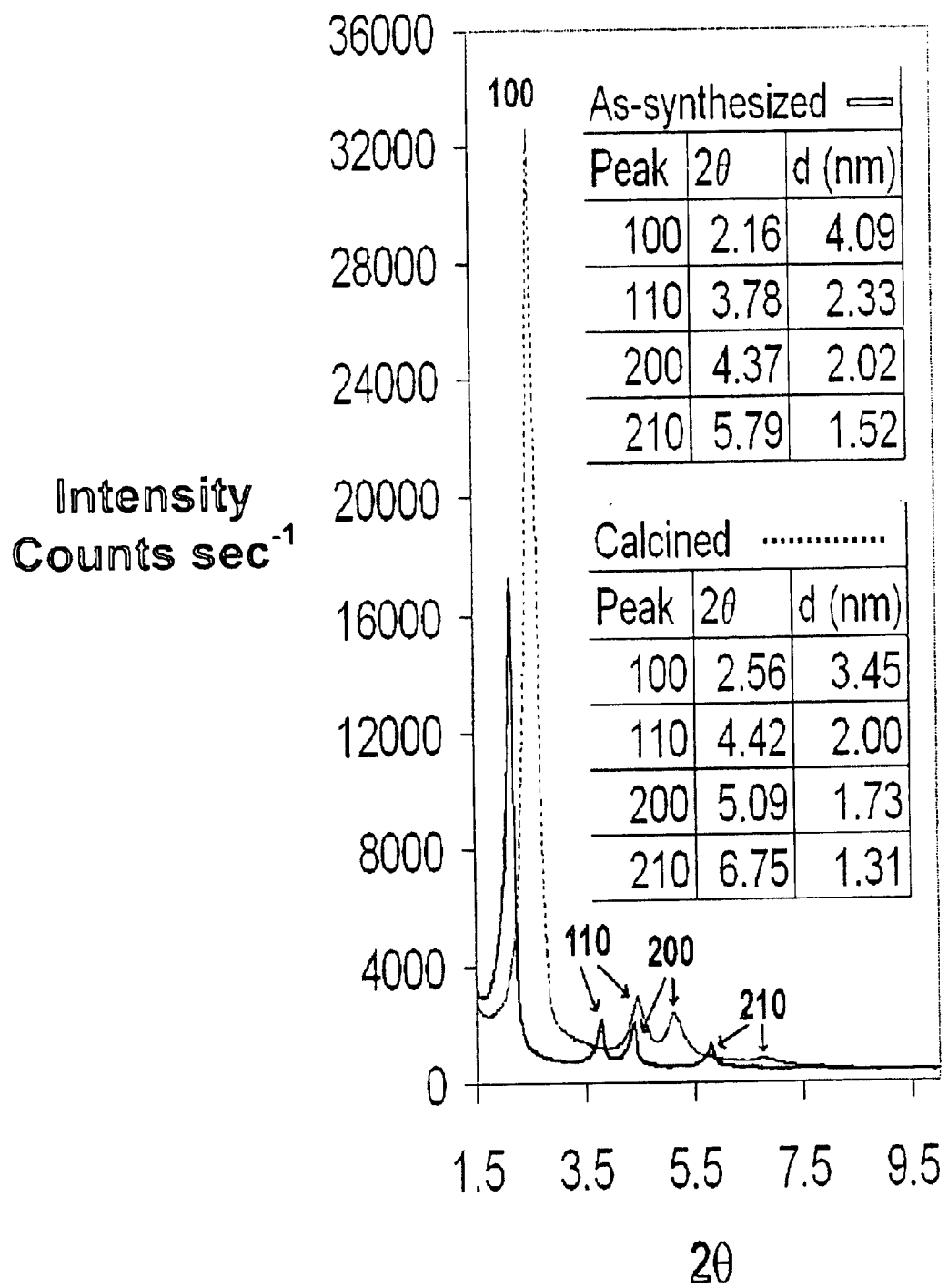
FIG. 2 shows powder X-ray diffraction patterns of as-synthesized and calcined gold/mesoporous silica nanocomposites. The peaks were indexed to an orthorhombic crystal lattice. Insets describe the respective d-spacing tables.

The stable and highly-ordered nature of the mesoporous silicate coating is supported by the results of X-ray diffraction analysis of both the as-synthesized, and calcined sample, as seen in FIG. 2. Four peaks are clearly visible in the as-synthesized samples that can be indexed to an orthorhombic lattice. The number of peaks observed, combined with the intensity of the (100) peak at 17300 counts per second indicates that the particles are of very high purity. The pore center-to-pore center distance estimated from X-ray diffraction is 4.1 nm. This is 0.3 nm larger than that estimated from TEM micrographs. On calcination the pore center-to-pore center distance decreased to 3.45 m and the intensity of the (100) peak nearly doubled in magnitude. This increase in adsorption has been observed in all nanocomposites analyzed to date and it is believed that this increase in intensity is due to a better penetration of the X-ray's through calcined pores. As four diffraction peaks are still observed, the results indicate that the structural integrity of this highly porous nanocomposite remains even after the removal of water and mesopore surfactant template.

EXAMPLE 5

Nitrogen Isotherm Analysis

Liquid nitrogen adsorption isotherms of 20 mg samples of the nanoparticles produced in Example 2 were measured using a Quantachrome Autosorb-1. Samples were activated under vacuum at 150° C. for 4 hours. Equilibration times were set at 5 minutes per point. Surface area calculations were made using the Brunauer, Emmett and Teller (BET) equation fitted to the first 10 points of each isotherm. Pore size distributions were calculated using the Kelvin equation.

Figure 3A:
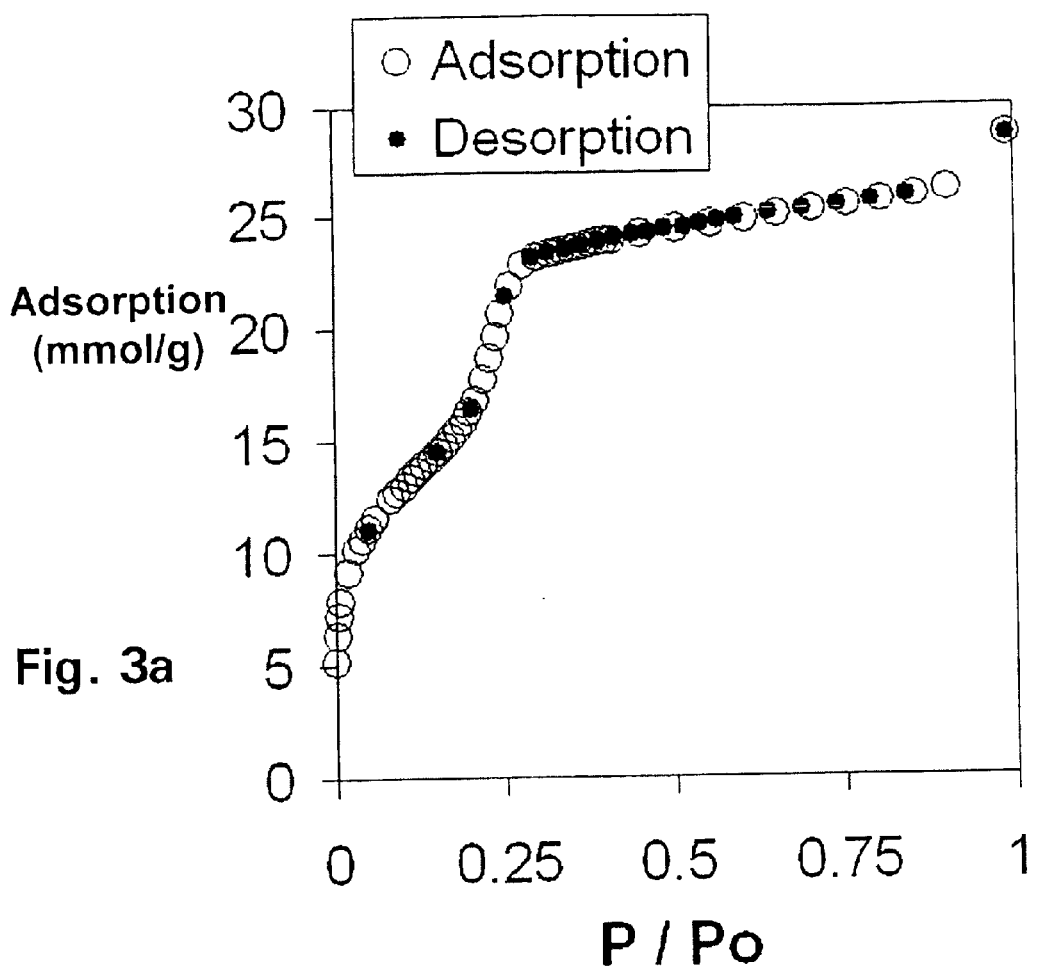
FIG. 3a shows a liquid nitrogen adsorption isotherm of calcined gold/mesoporous silica nanocomposite.
Figure 3B:
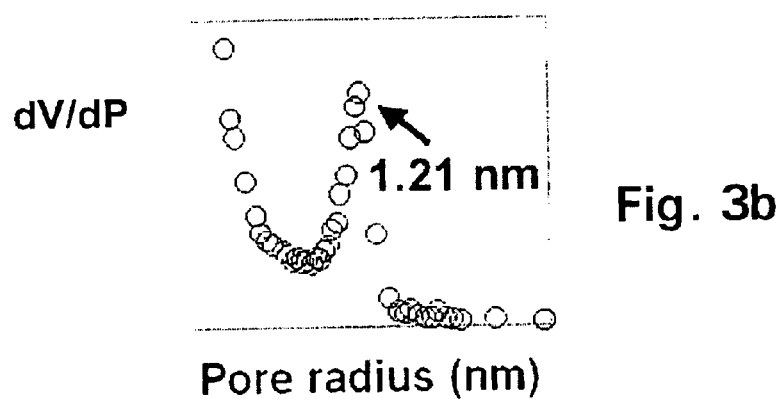
FIG. 3b shows the pore radius determined using the Kelvin equation.

The adsorption property of the calcined nanocomposite was estimated from a nitrogen adsorption isotherm. The isotherm shown in FIG. 3a is type four in character with a sharp inflection at the point of capillary condensation. No hysteresis in the adsorption-desorption cycle was observed, which is typical of MCM-41 type materials. The adsorption capacity of the nanocomposite material is 26.3 mmol $g^{-1}$ (or 0.91 mL $g^{-1}$) at 0.9 P/Po, which is 0.06 mL $g^{-1}$ greater than the value for pure silica nanoparticles recorded previously). The surface area was determined using the Brauner Emmet Teller equation to be 1176 $m^2\ g^{-1}$, again greater than for pure silica nanoparticles. From these results the pore radius could be determined using the Kelvin equation, and the average pore diameter obtained was 2.42 nm, which agrees well with the pore center-to-pore center distance of 3.45 nm determined from the X-ray diffraction pattern minus the pore wall thickness of 1 nm observed from the TEM micrograph, approximately 2.45 nm. The steep shape of the pore size distribution presented in FIG. 3b indicates that the pore size distribution is very narrow.

The material obtained in this illustrated embodiment is highly crystalline with a monodispersed pore size and high mesopore connectivity throughout. The pore size determined from a Kelvin equation fit to the liquid isotherm data agrees well with the results of X-ray diffraction and TEM analysis. The total adsorption capacity and surface area of the material was very high, as is expected for mesoporous silicate material. After calcining to clear the mesopore network, the colloidal gold nanoparticle at the center of the particle could be removing by dissolving with sodium cyanide solution resulting in a hollow structure with essentially identical structural characteristics.

EXAMPLE 6

Use of a Co-Solvent with TMOS

Nanoparticles were prepared using 15 nm diameter colloidal gold particles. The sol ratios are as follows:

| Experiment | Methanol | Water | TMOS | CTAB |
|---|---|---|---|---|
| 6a | | 5022 | 1 | 0.298 |
| 6b | 7740 | 262 | 1 | 0.28 |

Figure 4A:
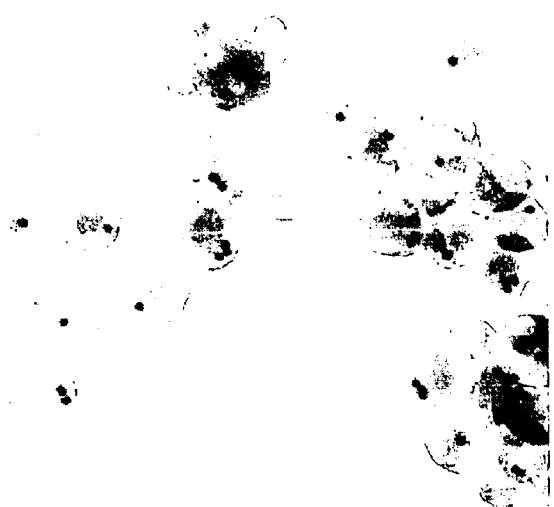
FIGS. 4a–b are transmission electron micrographs of microtomed gold/mesoporous silica nanocomposite particles produced using TMOS without (FIG. 4a) and with (FIG. 4b) a methanol co-solvent.
Figure 4B:

TEM micrographs of the resultant nanoparticles were produced as described in Example 3. As seen in FIGS. 4a–b, the resultant nanoparticles are spherical, with or without the methanol co-solvent. However, only the nanoparticles produced with the co-solvent are symmetrical, with the gold particle located in the center, whereas in the pure water system, the gold particle was at the edge. Thus, in the pure water system, the reaction growth was directional, while reaction growth was non-directional in the co-solvent system.

EXAMPLE 7

Use of a Co-Solvent with TEOS

Nanoparticles were prepared using 15 nm diameter colloidal gold particles. The sol ratios are as follows:

| Experiment | Ethanol | Water | TEOS | CTAB |
|---|---|---|---|---|
| 7a | | 2379 | 1 | 0.269 |
| 7b | 295 | 1428 | 1 | 0.269 |

Figure 5:
FIG. 5 is a transmission electron micrograph of microtomed gold/mesoporous silica nanocomposite particles produced using TEOS.

TEM micrographs of the resultant nanoparticles were produced as described in Example 3. As seen in FIG. 5, the nanoparticles produced in the pure water system are hexagonal, with the gold randomly dispersed within the structures. The hexagonal shape conforms with X-ray diffraction results, which indicate that the structure is orthorhombic. As was seen in Example 6, the nanoparticles produced in homogenous synthesis with the co-solvent (Experiment 7b) are symmetrical, with the gold particle in the center, whereas the nanoparticles produced in heterogeneous synthesis in pure water were faceted with asymmetrical directional growth.

It has been found that the pore center to pore center diameter is smaller with TEOS than with TMOS. Furthermore, the difference is greater in the heterogeneous system with synthesis in pure water. It is believed that the alcohol groups interfere with packing of mycelle particles.

EXAMPLE 8

Heterogeneous Synthesis with TPOS

Nanoparticles were prepared using the sol ratios as follows:

| Experiment | Water | NH₃ | TPOS | CTAB |
|---|---|---|---|---|
| 8 | 2000 | 30.24 | 1 | 0.123 |

In the first step, 16.4 g of ammonium hydroxide (27 wt %, $NH_3$ in water) was added to 329 ml of gold colloid solution. Next, 0.425 grams of CTAB was added with rapid stirring and after five minutes 2.73 ml of TPOS (tetrapropylorthosilicate) was added. After approximately 10 minutes, the solution became slightly turbid and after 2 hours the solution was filtered yielding a pale red precipitate.

Under homogeneous conditions with TPOS no particle formation was observed. This may be due to the extremely slow and incomplete hydrolysis of propylester groups of TPOS in the low dielectric constant medium. Silica oligomers with a majority of propylester groups still bound would likely form fewer linkages with CTAB molecules and thus generate less reactive primary particles. Free alcohols from the oligomer hydrolysis or solvent may also interfere with surfactant packing halting the self-assembly process.

Synthesis under heterogeneous conditions with TPOS, as in experiment 8, yielded large particles (the particles shown in FIG. 15 are 520×390 nm and 600×330 nm) with highly faceted morphologies and ordered mesopores. The phrase "ordered mesopores" refers to a material that contains pores that align over long range to form a pattern observable with TEM. An occupancy of 1% and cluster number of 1 and are likely due to the low concentration of 60 nm gold. Attempts were made to concentrate the gold but these resulted in rapid gold seed flocculation.

Figure 14:
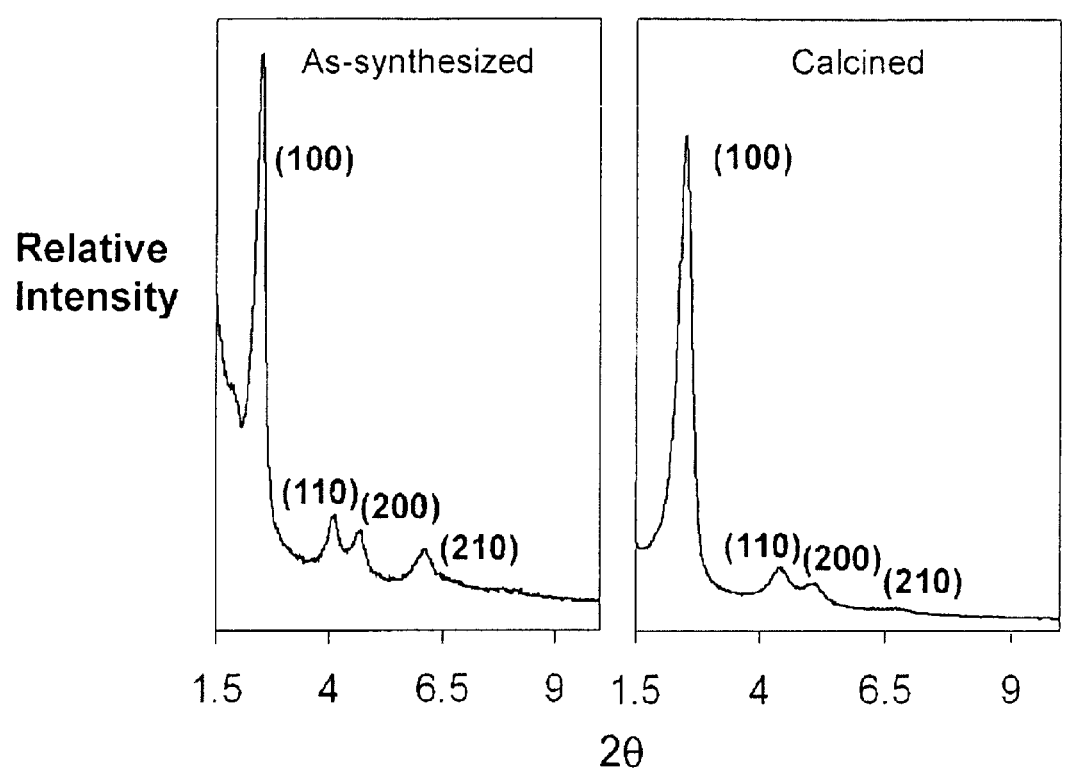
FIG. 14 shows powder X-ray diffraction patterns of as-synthesized and calcined gold/mesoporous silica nanocomposites prepared according to experiment 8.

The X-ray diffraction patterns for the particles formed according to experiment 8 are shown in FIG. 14. Four peaks are clearly visible for both as-synthesized and calcined samples and were indexed to a hexagonal unit cell. On calcination, the first peak, indexed to the (100) Bragg reflection, remained at almost a constant position but increased in intensity almost five times. However, the sample did not improve in long-range crystallinity because the fourth peak, indexed to the (210) Bragg reflection, broadened significantly on calcination. For this sample, the powder became very fine on calcination, allowing better distribution of powder crystallites on the sample plate in the diffractometer contributing to the improved intensity reading.

Figure 15A:
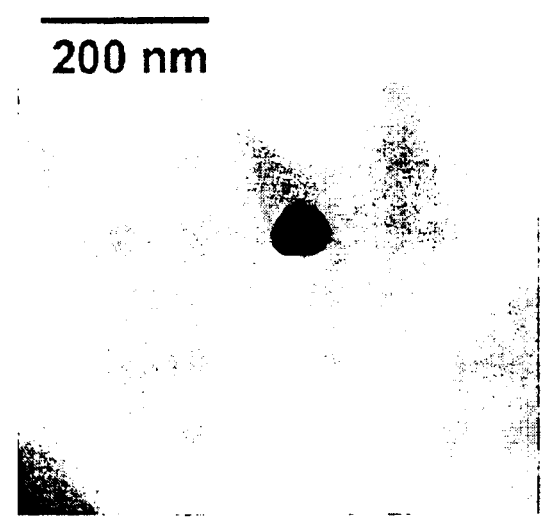
FIGS. 15a–c are transmission electron micrographs of microtomed mesoporous silica nanocomposite particles according to experiment 8.
Figure 15B:
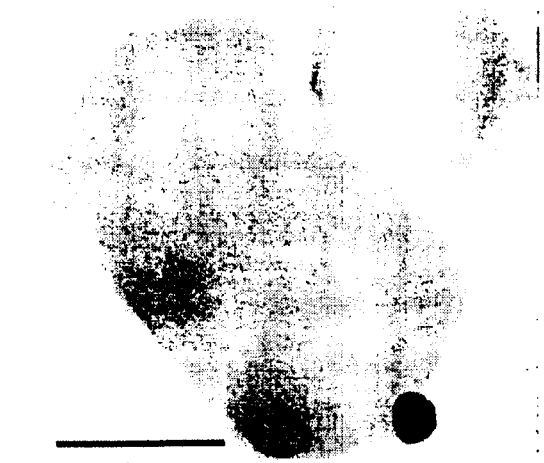
Figure 15C:
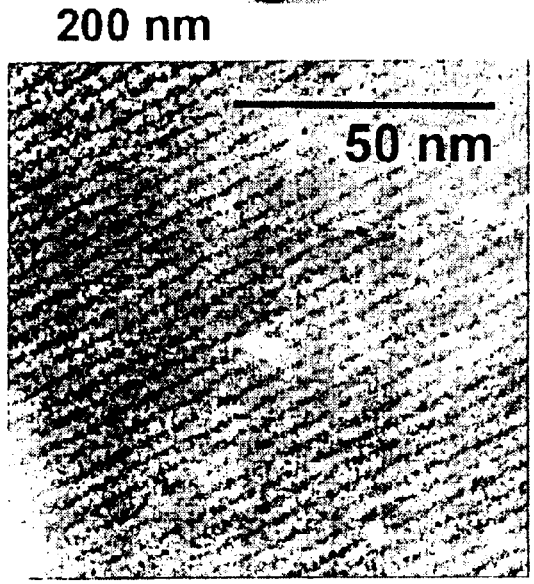

The TEM micrograph showing the mesochannels structure of a nanoparticle according to experiment 8 is shown in FIG. 15c. The mesopores are clearly ordered with a pore center-to-center distance of 3.6 nm, slightly smaller than 4.04 nm recorded from X-ray diffraction. The gold particle appeared at the edge of the majority of particles, with mesopores extending along the length of the particle in the direction of self-assembly as shown in FIG. 15b. FIG. 15a shows a particle prepared using a gold particle with a non-spherical irregular surface. The overall particle shape mimicked the shape of the gold seed. The shape-mimicking of the seed by the mesopore network provides a method for generating nanostructures with controlled shape.

EXAMPLE 9

Homogeneous Synthesis using a Neutral Template

Nanoparticles were prepared using the sol ratios are follows:

| Experiment | 2-Propanol | Ethanol | Water | NH₃ | TEOS | n-dodecylamide |
|---|---|---|---|---|---|---|
| 9a | 23.3 | 351 | 1143 | 3.79 | 1 | 0.29 |
| 9b | 7.76 | 117 | 381 | 1.26 | 1 | 0.29 |

For experiment 9a, 78.6 g of ethanol and 0.290 g of n-dodecylamine was added to 100 ml of deionized water with rapid stirring. The pH of the n-dodecylamine solution was 11.1 Next, 9.2 ml of ammonium hydroxide solution (2.0 M $NH_3$ in 2propanol) was added and the solution pH increased to 11.3. After five minutes, 1.084 g of TEOS was added with rapid stirring and after an additional ten minutes, the solution became slightly turbid indicating hydrolysis. The suspension was filtered after 24 hours and determined to have a final pH of 10.6. Experiment 9b was performed under the same conditions with a higher concentration of TEOS and n-dodecylamine.

Figure 16A:
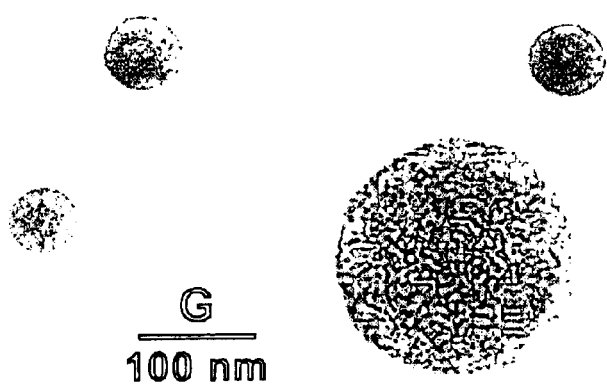
FIGS. 16a–b are transmission electron micrographs of microtomed mesoporous silica nanocomposite particles according to experiments 9a and 9b, respectively.
Figure 16B:
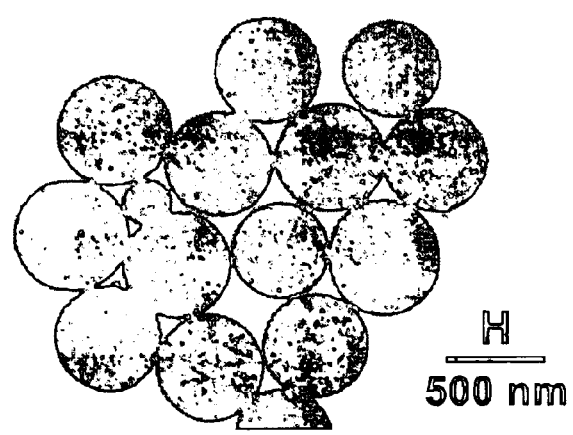

The TEM micrographs of as-prepared particles according to experiments 9a and 9b are shown in FIGS. 16a–b. The average particle diameters obtained were 60 and 550 nm for the lower and higher concentrations of TEOS and n-dodecylamine, respectively. The smaller particles formed a colloidal suspension, which was stable for several days under quiescent conditions. After settling, both samples could be resuspended by sonication in deionized water. The larger particles were the most monodispersed in size obtained via any of the presently illustrated methods and when precipitated formed closely packed arrays. The inset of the micrograph for experiment 9a (labeled "G" in FIG. 16a) is an expanded image of a single nanoparticle. In contrast to particles prepared using CTAB, disordered mesopores are clearly visible. The particles also have spherical as opposed to faceted morphology. Thus, this is a clear example of non directional self-assembly. Disordered mesopore arrays are typical of materials prepared with a neutral template.

EXAMPLE 10

Multiple Core Nanoparticle

Figure 6:
FIG. 6 is a transmission electron micrograph of microtomed gold/mesoporous silica nanocomposite particles prepared in two stages.
Figure 6:

Nanoparticles were prepared in two stages. In the first stage, nanoparticles were produced in a pure water TEOS system, as in Example 7a, except using a 60 nm gold particle. The second stage was an ethanol co-solvent system. As seen in FIG. 6, two different directions of growth are observed. In the first stage the growth is directionally away from the gold particle and in the second stage, the growth is non-directional. It is understood that the stages could be reversed, or other pure water or co-solvent systems could be employed, to produce a variety of multiple core nanoparticles.

EXAMPLE 11

Single and Multiple Center System

Nanoparticles were prepared using 15 nm diameter colloidal gold particles. The sol ratios are as follows:

| Experiment | Methanol | Water | TMOS | CTAB |
|---|---|---|---|---|
| 11 | 7740 | 26250 | 1 | 0.14 |

Figure 7:
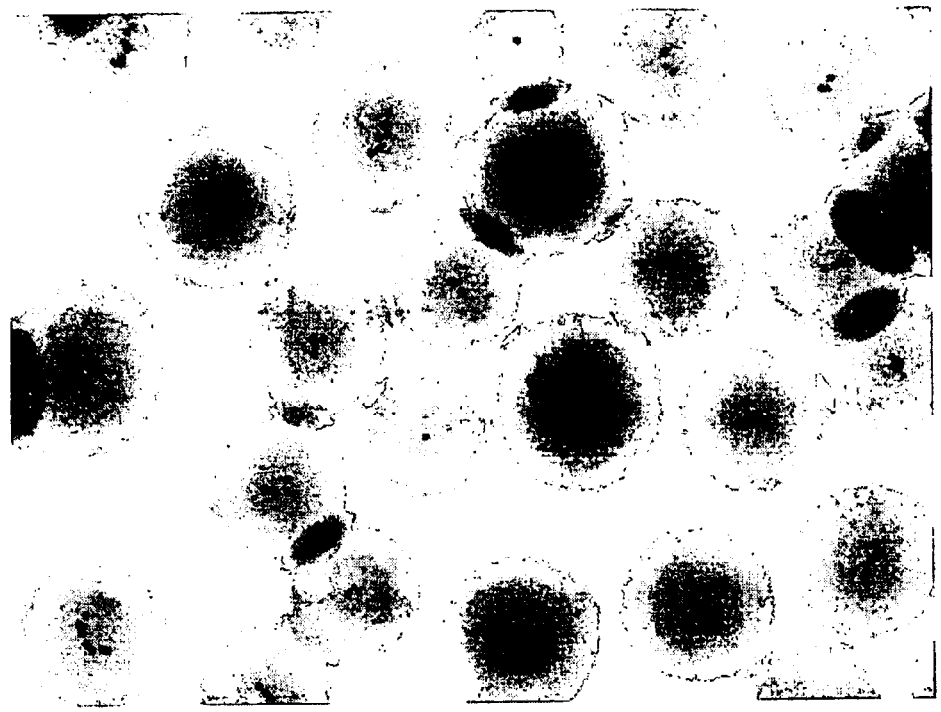
FIG. 7 is a transmission electron micrograph of microtomed mesoporous silica nanocomposite particles having multiple gold centers.

As seen in FIG. 7, the TEM micrograph of the resultant nanoparticles are spherical, with one or more gold particles located centrally.

Multiple center nanoparticles are believed form for various reasons. For example, if the silicate concentration in the solution is high (depending on the silicate source used), then the forming shells are dissolving as fast as they are forming. It is believed that these multiple center nanoparticles form by adjacent growing particles sticking together and that the gold cores in these particles have a thin layer of silicate between them.

Alternatively, multiple center nanoparticles can be produced by adding the surfactant rapidly enough to the gold that the surfactant has the opportunity to adhere gold particles together before a shell is formed. In such a case there is no silicate between the particles and the core chambers are linked together.

EXAMPLE 12

Effects of Changing CTAB to Silica Ratio

Nanoparticles were prepared using 15 nm diameter colloidal gold particles. The sol ratios are as follows:

| Experiment | Methanol | Water | NaOH | TEOS | CTAB |
|---|---|---|---|---|---|
| 12a | 886 | 2362 | 0.161 | 1 | 0.126 |
| 12b | 886 | 2362 | 0.161 | 1 | 0.27 |
| 12c | 886 | 2362 | 0.161 | 1 | 0.54 |
| 12d | 886 | 2362 | 0.161 | 1 | 1.25 |
| 12e | 2123 | 5655 | 0.143 | 1 | 0.54 |
| 12f | 4730 | 12597 | 0.320 | 1 | 0.67 |

The particles obtained from each of these experiments are shown in FIGS. 13a–f. At the low CTAB-to-silica ratios, smaller primary particles with fewer associated surfactant tails form with a weaker dispersion potential and lower chemical activity towards self-assembly. As a result, the relative activity of CTAB coated gold seeds increases, leading to more seed flocculation. Higher CTAB-to-silica ratios would form a greater numbers of larger CTAB/silica primary particles, with a greater dispersion potential, higher reactivity, and hence lower cluster numbers. Thus, the effects of increasing the CTAB to silica ratio include reduced flocculation of the gold seeds and an increased probability of non-seed self assembly.

EXAMPLE 13

Starburst Morphologies

Nanoparticles were prepared without gold particles (13a) or using 15 nm diameter colloidal gold particles (13b). The sol ratios are as follows:

| Experiment | Ethanol | Ammonia | Water | TEOS | CTAB |
|---|---|---|---|---|---|
| 13a | 58 | 6.72 | 159 | 1 | 0.3 |

| Experiment | Methanol | Water | TMOS | CTAB |
|---|---|---|---|---|
| 13b | 7740 | 26250 | 1 | 0.14 |

Figure 8A:
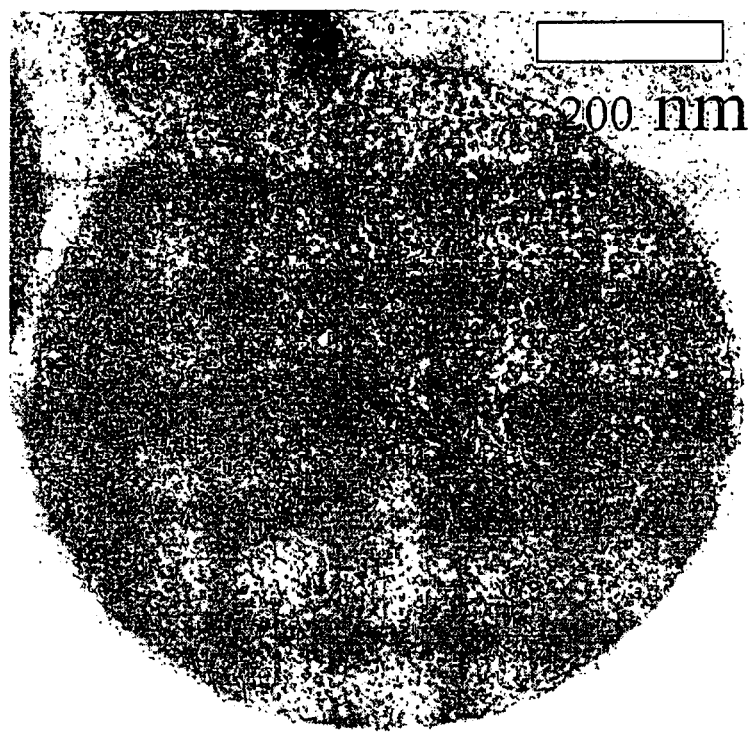
FIGS. 8a–b are transmission electron micrographs of a microtomed mesoporous silica nanocomposite particle having starburst morphology.
Figure 8B:
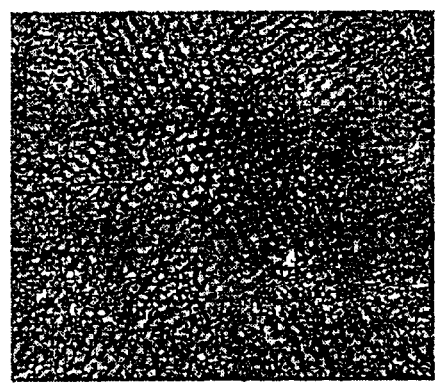
Figure 9:
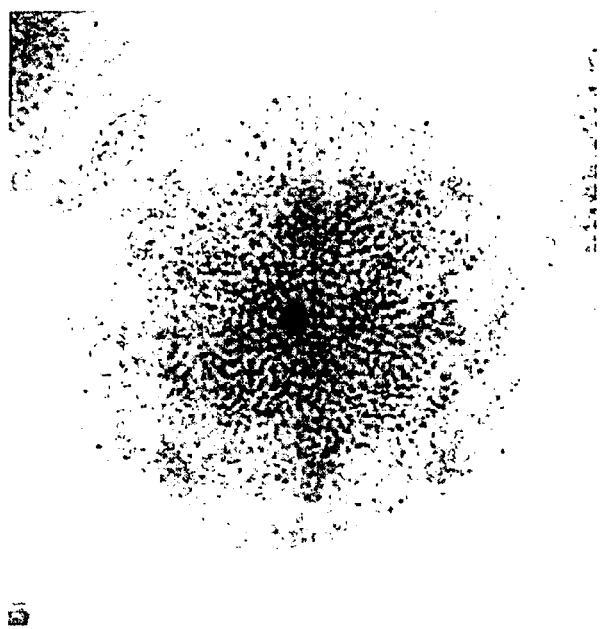
FIG. 9 is a transmission electron micrograph of a microtomed gold/mesoporous silica nanocomposite particle having starburst morphology.

TEM micrographs of the resultant nanoparticles were produced as described in Example 3. As seen in FIGS. 8a–b and 9, the resultant nanoparticles are spherical, with pore structures provided in a starburst pattern.

EXAMPLE 14

Crystalline Morphologies

Nanoparticles were prepared without gold particles (14c) or using 15 nm diameter colloidal gold particles (14a–b). The sol ratios are as follows:

| Experiment | Ethanol | NaOH | Water | TEOS | CTAB |
|---|---|---|---|---|---|
| 14a | | | 2379 | 1 | 0.269 |
| 14b | | 0.3111 | 1164 | 1 | 0.1224 |
| 14c | | 0.3111 | 1164 | 1 | 0.1224 |

Figure 10:
FIG. 10 is a transmission electron micrograph of microtomed mesoporous silica nanocomposite particles having hexagonal crystalline shape morphology.
Figure 13:
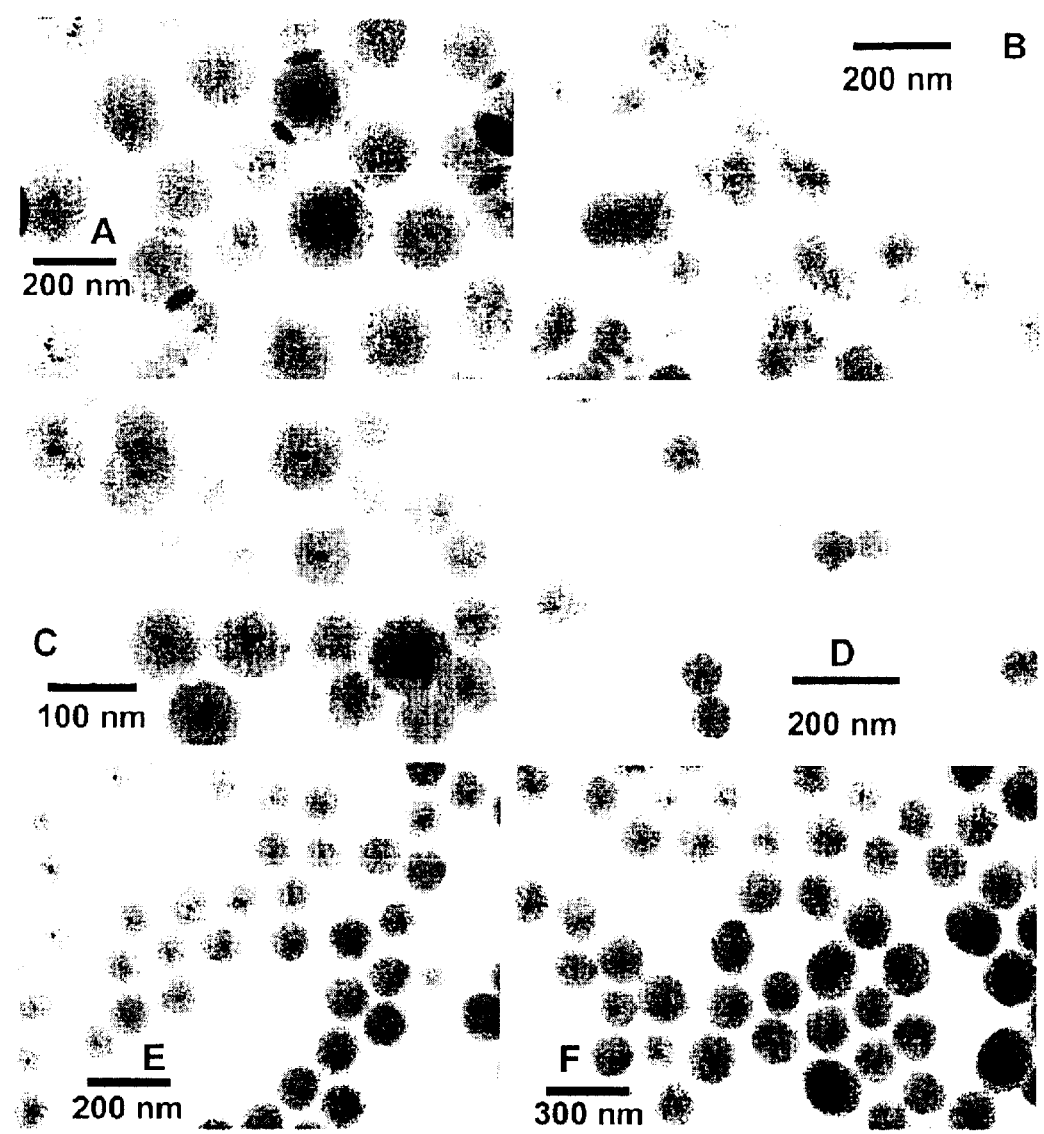
FIGS. 13a–f are transmission electron micrographs of microtomed mesoporous silica nanocomposite particles with varying CTAB to silica ratios.

TEM micrographs of the resultant nanoparticles were produced as described in Example 3. As seen in FIG. 10, the nanoparticles produced according to experiment 14a have hexagonal crystalline shape morphologies with the gold particle at an edge. It is believed that the pores run lengthwise. As seen in FIG. 12, the nanoparticles produced according to experiment 14a have hexagonal crystalline shape morphologies with the gold particle at a corner. It is believed that the pores run in short distances. FIGS. 12a–b show that the nanoparticles produced according to experiment 14c have crystalline morphology with pores that run along the length of the structure.

Although the invention has been described in detail with reference to certain preferred embodiments, variations and modifications exist within the scope and spirit of the invention as described and defined in the following claims.

What is claimed is:

1. A method of preparing a nanocomposite particle comprising the steps of:
   binding a silicate compound to the surface of a colloidal metal particle in an aqueous suspension,
   wherein the colloidal metal particle is a colloidal gold particle,
   adding a silicate source and an organic surfactant template, and
   stirring the aqueous suspension to obtain silicate growth of a mesoporous silicate structured coating.

2. The method of claim 1 wherein the silicate compound is mercaptopropyl-trimethoxysilafle.

3. A method of preparing a nanocomposite particle comprising the steps of:

binding a silicate compound to the surface of a colloidal metal particle in an aqueous suspension, adding a silicate source and an organic surfactant template, stirring the aqueous suspension to obtain silicate growth of a mesoporous silicate structured coating, and dissolving the colloidal metal particle to yield a hollow nano-shell.

4. A hollow nanocomposite particle produced according to the method of claim 3.

5. The hollow particle of claim 4 where the void volume is loaded with a compound selected from the group comprising water, oils, catalysts, organic dye molecules, nucleic acids, and other biologically significant compounds.

6. The hollow particle of claim 4 where the void volume is loaded with a volatile gaseous species selected from the group consisting of hydrogen, oxygen, and methane.

* * * * *